Aug. 12, 1969 F. J. HODGE ET AL 3,461,230

DROPOUT COMPENSATOR WITH DELAYED RESPONSE

Filed Nov. 10, 1965 2 Sheets-Sheet 1

(a) (b)

INVENTORS:
Frederick J. Hodge
Ralph R. Barclay
By Smyth, Roston & Pavitt,
Attorneys INVENTORS:
Frederick J. Hodge
Ralph R. Barclay
By [signature]
Attorneys United States Patent Office 3,461,230
Patented Aug. 12, 1969

3,461,230

DROPOUT COMPENSATOR WITH DELAYED RESPONSE

Frederick J. Hodge and Ralph R. Barclay, Camarillo, Calif., assignors to Minnesota Mining and Manufacturing Company, St. Paul, Minn., a corporation of Delaware Filed Nov. 10, 1965, Ser. No. 507,210
Int. Cl. H04n 5/76; H03d 3/24
U.S. Cl. 178—6.6 19 Claims

ABSTRACT OF THE DISCLOSURE

The present invention is directed to a dropout compensator which includes a dropout detector to provide for a detection of a reduction in amplitude of a frequency modulated video signal and wherein the dropout detector includes means for delaying the production of the control signal and with an actual inhibiting of such production until the detected reduction in amplitude is below a predetermined level for a particular period of time. This delay in the production of the control signal insures that the dropout is not due to noise or some other type of amplitude variation but is actually a true dropout. The present invention also includes a specific detector circuit that provides for this delay of the production of the control signal by charging a first capacitor through a previously charged second capacitor. The particular delay that is included in the dropout detector circuit should be at least 0.8 microsecond.

Figure 1:
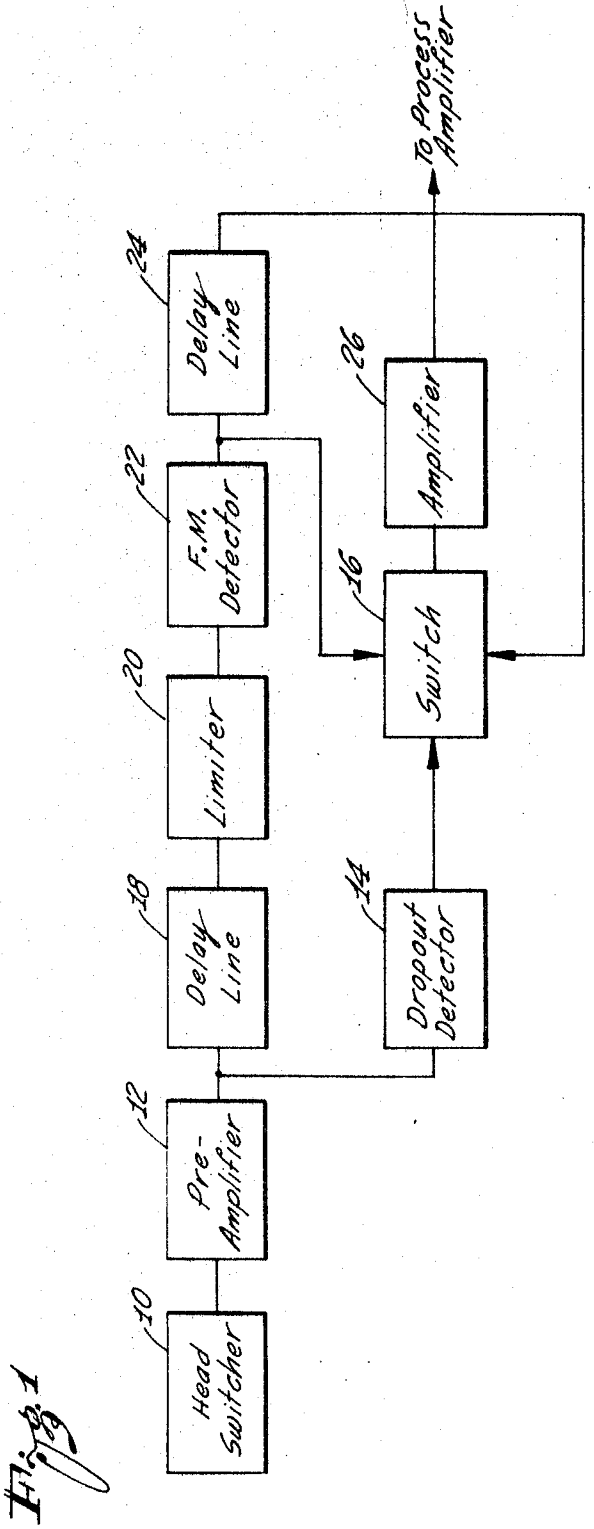

This invention relates to a compensator. More specifically, the invention relates to a compensator which provides compensation in a television reproducing system for drop-outs in the video signal.

A common method of storing television programs is to record the video signals on a magnetic tape. The magnetic tape may be replayed at a later time so as to reproduce the video information. The video signal is usually frequency modulated before it is recorded on the magnetic tape. After reproduction of the frequency modulated video signal, the signal is demodulated so as to reproduce the video information.

One problem which has arise during the reproduction of the recorded frequency modulated video signal from the magnetic tape is drop-outs which appear in the reproduced video signal. A drop-out in the video signal during reproduction can result from many different causes. For example, any momentary malfunction in the record or playback apparatus during the recording and reproduction of the video signal may result in a momentary loss of signal. The momentary loss of signal is known as a drop-out. In addition, debris from the magnetic head, or the magnetic tape, may accumulate on the tape so as to cause a momentary loss of signal. Further, flaws in the magnetic tape such as scratches, craters, protrusions, etc., may cause a momentary loss of signal or drop-out. Finally, foreign particles on the tape, such as dirt or dust, may result in a momentary loss of signal.

It is to be appreciated that other factors in addition to the above causes may result in a drop-out or momentary loss of signal. The momentary loss of the signal results in a spot or streak which appears on the face of the picture tube. The spot or streak is annoying to a television viewer, especially if the drop-outs occur frequently.

There have been prior art systems which have provided drop-out compensation. The most successful of the prior art systems accomplished the drop-out compensation by delaying the video signal reproduced from the magnetic tape a particular length of time so as to provide both a delayed and undelayed video signal. The delay is usually equal to the time required for one horizontal scan in a television receiver. The undelayed video signal is then monitored to detect drop-outs in the video signal. When no drop-out is present in the video signal, the drop-out compensator passes on the undelayed video signal as the output signal. When a drop-out is detected in the video signal, the drop-out compensator switches to the delayed television signal to provide the output signal. The switching to the delayed television signal to provide the output signal in place of the undelayed television signal provided video information from a previous horizontal line which does not contain a drop-out. The using of a previous horizontal line of information, or a portion of a previous horizontal line of information, is not noticeable to a television viewer since adjacent horizontal lines of video information are largely redundant. Therefore, the occasional repeating of a horizontal line, or a portion of a horizontal line, compensates for the drop-out.

Prior art systems which generally operate on the above principles are disclosed in U.S. Patent No. 3,347,984, issued Oct. 17, 1967, in the name of Berten A. Holmberg and assigned to Minnesota Mining and Manufacturing Company, and in U.S. Patent No. 3,328,521, issued June 27, 1967, in the name of Irving Moskovitz and assigned to Minnesota Mining and Manufacturing Company.

The prior art systems as discussed above are all directed to the detection and the compensation of any drop-outs in the video signal as quickly as possible. The detection of the drop-out is usually accomplished by establishing a minimum amplitude level that is acceptable in the frequency modulated video signal. When the amplitude of the frequency modulated video signal falls below that level, the drop-out detector is then designed to operate as quickly as possible so as to provide the compensation as quickly as possible and to minimize any delay compensation necessary in the system. For example, some prior art systems were designed to operate within 0.4 microsecond after the amplitude of the frequency modulated video signal falls below a particular level.

Until relatively recently, magnetic tape television recording systems frequency modulated the video signal with a carrier signal having a frequency of approximately 5.6 megacycles to 7.2 megacycles. The newer recording systems frequency modulate the video signal with a carrier signal having a frequency much higher than the prior systems. For example, the carrier frequency may now be on the order of 10 megacycles. The use of a carrier signal of a higher frequency also results in frequency modulated video signals which extend over a much wider frequency range than prior art systems. The recording of the frequency modulated video signals over a broad frequency range produces a decrease in the amplitude of the recorded frequency modulated video signals at the higher frequencies. This decrease in amplitude of the higher frequency recorded signals is due to the drop-off in response of the magnetic tape at the higher frequencies. The drop-off in amplitude of the higher frequency recorded signals, in comparison to the lower frequency recorded signals, also results in increased amplitude variations of the total recorded frequency modulated video signal over the prior recorded frequency modulated video signals.

When the video information represents quick changes in light amplitude, for example, when going from black to white, the quick changes are reflected by a video signal having a large high frequency content. This, in turn, produces a frequency modulated video signal with a large high frequency content. The high frequency portion of the frequency modulated video signal thereby results in a decreased amplitude of the recorded signal. Prior art drop-out compensators would detect these decreased amplitudes as if they were drop-outs and provide an undesired compensation. The undesired compensation was provided because the prior art drop-out compensators provided a substantially instantaneous detection of amplitude variations. In addition, noise, which is also characterized by rapid changes in amplitude, may also appear as a drop-out to prior art drop-out compensators. The detection of all amplitude variations as drop-out is undesirable since a continual detection of non-existent drop-outs may result in a deleterious effect on the television picture. Although a small amount of redundancy in the television picture would not be noticeable, continual redundancy may produce undesirable effects on the television picture.

The present invention overcomes the above difficulties by deliberately introducing a delay before producing a control signal to actuate the drop-out compensation. In other words, the present invention deliberately provides a delay so as to be sure that a drop-out actually is occurring. The amount of the delay is somewhat critical since if the delay is too great the compensator would not provide compensation for small drop-outs. However, if the delay is too small the compensator would provide undesirable compensation for noise and quick changes in light amplitude as explained above. It has been determined that the delay should be at a minimum of 0.8 microsecond with an optimum value of approximately 1 microsecond. Although the present invention deliberately introduces a delay in the production of the control signal, this does not result in an adverse effect on the television picture by not providing a complete compensation for the drop-out. The present invention provides an additional delay in the compensating system so that the drop-out compensator provides the compensation across the entire drop-out period. In addition, the present invention provides a detecting circuit which has a linear response so that the drop-out compensator is accurately controlled to operate at the same point for each occurrence of a drop-out.

Figure 2:
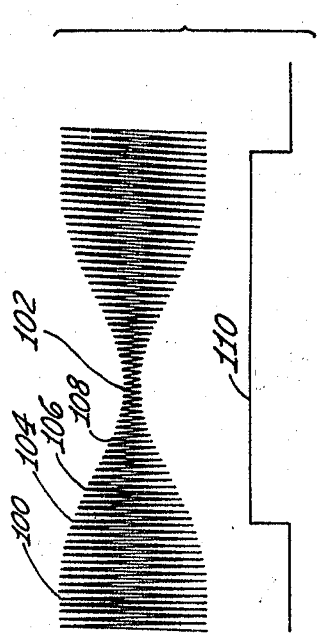
Figure 3:
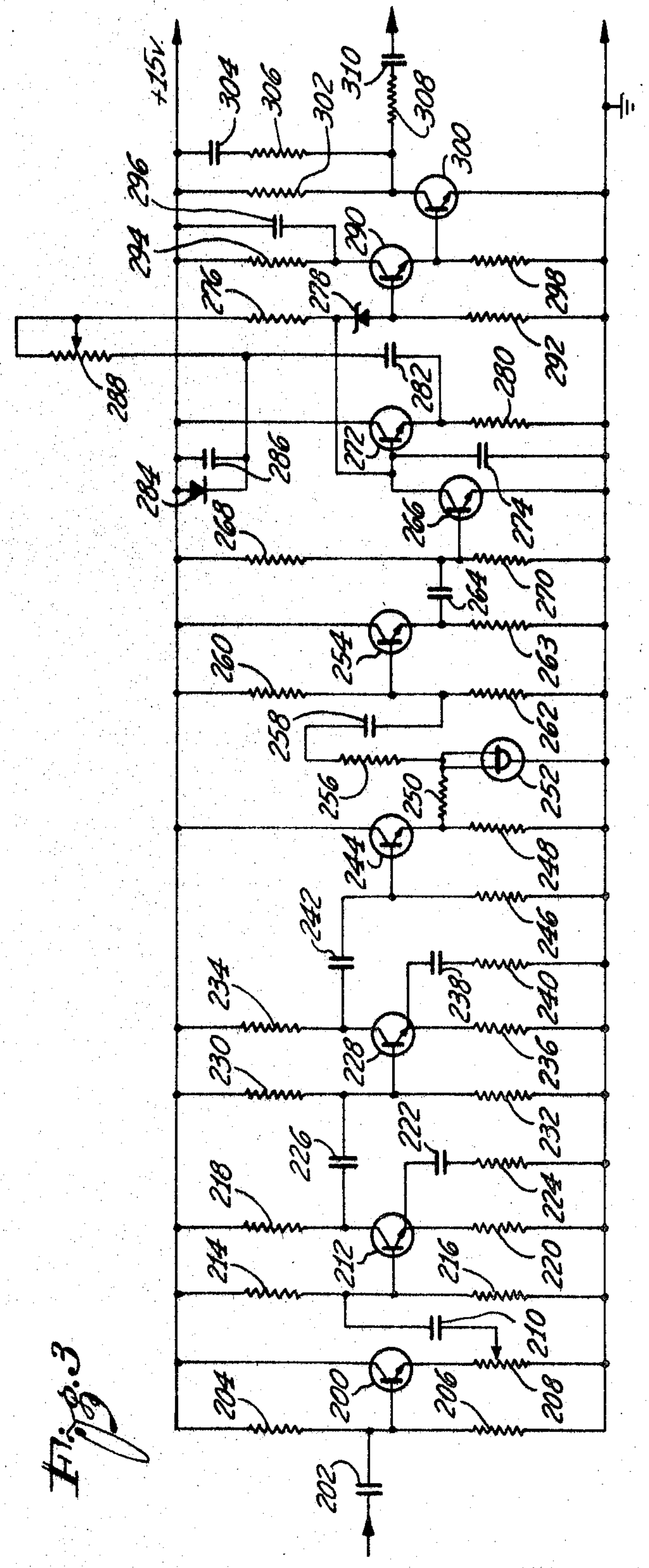

A clearer understanding of the invention will be had with reference to the drawings wherein:

FIGURE 1 is a block diagram of a system for providing drop-out compensation;

FIGURE 2*a* illustrates a frequency modulated video signal which includes a drop-out portion;

FIGURE 2*b* illustrates the period of time over which the drop-out compensator of FIGURE 1 provides compensation; and FIGURE 3 is a schematic of a circuit which may be used for the drop-out detector of FIGURE 1.

In FIGURE 1 a head switcher 10 reproduces the video signals recorded on a magnetic tape (not shown). The video signals are in a frequency modulated form as shown in FIGURE 2*a* at position 100. The frequency modulated video signal from the head switcher 10 is applied to a pre-amplifier 12 which provides an amplification of the signal. The frequency modulated video signal from the preamplifier 12 is applied to a drop-out detector 14. In FIGURE 2*a* a drop-out in the frequency modulated video signal 100 is shown at position 102. In the prior art, a frequency modulated video signal was considered to have a drop-out when the amplitude of the signal fell below a particular value. For example, an amplitude at position 104 of FIGURE 2*a* may have been considered to be the lowest acceptable level before it was arbitrarily determined that a drop-out exists in the signal. In the prior art systems the emphasis was on producing a control signal as soon as possible after the frequency modulated video signal fell below the level 104. For example, the prior art systems provided a control signal for drop-out compensation before the frequency modulated video signal 100 reached a position 106. For example, the control signal would be generated within 0.4 microsecond.

The prior art drop-out compensator may over compensate due to ampltiude variations in the frequency modulated video signal 100 which result from noise or from large changes in the light amplitude. The over compensation is compounded due to the reduction in the amplitude of the response curve of the magnetic tape of high frequency. The over compensation is particularly significant when using a carrier signal having frequencies approaching 10 megacycles. The present invention eliminates the over compensation provided by the prior art drop-out compensators by deliberately delaying the production of a control signal until a much later time. For example, as shown in FIGURE 2*a*, a control signal is not produced until the frequency modulated video signal 100 reaches the position 108. By the time the frequency modulated video signal reaches the point 108 it is relatively certain that a drop-out is present.

In FIGURE 1, the drop-out detector 14 provides a control signal which is applied to the switch 16. The switch 16 is, therefore, controlled in accordance with the value of the control signal from the drop-out detector 14. The frequency modulated video signal from the preamplifier 12 is also applied to a delay line 18. The delay line 18 has a delay equal to the delay in the drop-out detector 14 and any delay in the switch 16.

The delay provided by the delay line 18 insures that the drop-out compensation is effective over the complete period of the drop-out. This can be seen with reference to FIGURE 2*b* wherein a line 110 illustrates a period of time over which the drop-out compensation is provided. It can be seen that the period of time 110 extends over the complete period of the drop-out. Since the delay line 18 provides the additional delay, the information signal 100 shown in FIGURE 2*a* is delayed a sufficient amount so that the drop-out detector 14 provides the compensation over the complete period of the drop-out. Since the drop-out detector 14 has a much larger delay over the prior art drop-out detectors, the delay line 18 must also provide a much larger delay. In order that the delay line 18 has the minimum effect on the video information, the delay is introduced at a point before the frequency modulated video signal is demodulated. The delay line 18 has a smaller effect on the video information because the relative frequency variations of the frequency modulated video signal are smaller than the frequency variations of the demodulated video signal. The frequency modulated video signal is then applied to a limiter 20 and a FM detector 22 so as to demodulate the frequency modulated video signal.

It is to be noted in FIGURES 2*a* and 2*b* that the period of drop-out compensation extends past the end of the drop-out in the information signal 100. The lengthening of the period of drop-out compensation is accomplished in the drop-out detector 14 shown in FIGURE 1. The lengthening of the period of drop-out compensation is to insure stability in the output signal from the drop-out compensator. Instability may result because the limiter 20 operates on a symmetrical basis. When a drop-out occurs, the amplitude of the frequency modulated video signal is insuffcent to activate the limiter. When the amplitude of the frequency modulated video signal rises so as to once more activate the limiter 20, it requires a few cycles for the limiter 20 to settle down to a symmertical operation. We, therefore, provide the additional delay at the end of the period of drop-out compensation so as to allow the limiter 20 to settle down before we switch back to the uncompensated video signal.

The demodulated video signal from the FM detector 22 is applied both to the switch 16 and to a delay line 24. The delay line 24 provides a delay usually equal to the time required for one horizontal line scan in a television picture. This is equal to 63.5 microseconds. The output from the switch 16 is amplified by an amplifier 26 and is then passed on to the remaining equipment in the reproducing system.

During the normal operation of the circuit of FIGURE 1, no drop-outs are present in the frequency modulated video signal. The frequency modulated video signal is detected by the head switcher 10, amplified by the preamplifier 12, delayed by the delay line 18 and demodulated by the limiter 20 and FM detector 22. The video signal then passes through the switch 16 and to the amplifier 26. The normal operation of the switch 16 is to allow the video signal to pass from the FM detector 22 through the amplifier 26. The video signal from the FM detector 22 also passes through the delay line 24 and is again applied to the switch 16. The video signal from the delay line 24 is normally blocked by the switch 16. When the drop-out detector 14 detects a drop-out in the frequency modulated video signal, the drop-out detector 14 produces a control signal which extends over the period of time as shown by line 110 of FIGURE 2*b*. The control signal is applied to the switch 16 so as to control the switch 16 to pass the delayed video signal from the delay line 24 to the amplifier 26 and to block the relatively undelayed video signal from the FM detector 22. The system, therefore, substitutes a preceding portion of the video signal in place of the portion of the video signal having the drop-out. As explained above, adjacent lines of a television picture are relatively redundant, and the replacement of a line or a portion of a line with an adjacent line or a portion of a line is virtually undetectable by the television viewer.

It is to be appreciated that any conventional type of switching circuit may be used for the switching circuit 16 of FIGURE 1. As a specific sample of a witching circuit which may be used, reference is made to U.S. Patent No. 3,328,521, in the name of Irving Moskovitz.

FIGURE 3 illustrates a specific embodiment of a drop-out detector which may be used for the drop-out detector 14 of FIGURE 1. In FIGURE 3, the frequency modulated video signal is coupled to the base of a transistor 200 through a coupling capacitor 202. A pair of resistors 204 and 206 are connected in series between a positive supply potential and a reference potential such as ground and have their common junction point connected to the base of the transistor 200. The resistors 204 and 206 have resistance values to provide the proper biasing for the base of the transistor 200. The collector of the transistor 200 is connected directly to the positive potential. The emitter of the transistor 200 is connected to one terminal of a potentiometer 208. The potentiometer 208 extends between the emitter of the transistor 200 and the reference potential such as ground.

The transistor 200 is connected in the circuit to operate as an emitter follower. This emitter follower portion of the drop-out detector is used to provide impedance matching and also isolation for the remaining portion of the detector circuit shown in FIGURE 3. The output signal from the emitter follower is taken from the output arm of the potentiometer 208 and is coupled through a coupling capacitor 210 to the base of a transistor 212. The position of the movable arm of the potentiometer 208 determines the amplitude of the signal applied to the base of the transistor 212. The arm of the potentiometer 208 is adjusted so as to provide the desired sensitivity for the drop-out detector circuit of FIGURE 3.

A pair of biasing resistors 214 and 216 provide the proper biasing for the base of the transistor 212. A resistor 218 is electrically disposed between the collector of the transistor 212 and the positive supply potential. The resistor 218 operates as a load resistor for the transistor 212. The emitter of the transistor 212 is connected through a series-parallel circuit to the reference potential such as ground. The series-parallel circuit includes a resistor 220 in parallel across the series combination of a capacitor 222 and a resistor 224. The output from the transistor 212 is taken at the collector and is applied through a coupling capacitor 226 to the base of a transistor 228. A pair of resistors 230 and 232 provide the proper biasing for the base of the transistor 228. A resistor 234 is electrically disposed between the collector of the transistor 228 and the positive supply potential. The resistor 234 operates as a load resistor for the transistor 228. The emitter of the transistor 228 is connected to the reference potential such as ground through a series-parallel circuit including a resistor 236 in parallel across the series combination of a capacitor 238 and a resistor 240.

The transistors 212 and 228 in the circuit provide for an ampllification of the signal to a more useful level while maintaining a high signal-to-noise ratio. In addition, the transistors 212 and 228 operate to suppress one-half of the frequency modulated video signal, as shown in FIGURE 2*a*. The biases on the transistors 212 and 228 are designed so that these transistors operate toward cutoff when a drop-out appears in a frequency modulated video signal. This prevents the coupling capacitors from storing a charge when the drop-out occurs. The coupling capacitors would store a charge if the transistors 212 and 228 operated toward saturation when a drop-out occurred.

The output from the transistor 228 is applied through a coupling capacitor 242 to the base of a transistor 244. A biasing resistor 246 is disposed between the base of the transistor 244 and the reference potential such as ground. The collector of the transistor 244 is applied directly to the positive supply potential. The output from the transistor 244 is taken at the emitter across a resistor 248. The transistor 244 is connected in circuit to operate as an emitter follower. The output from the transistor 244 is applied through a resistor 250 to one terminal of a tunnel diode 252. The other terminal of the tunnel diode 252 is connected directly to the reference potential such as ground. The tunnel diode diode 252 is driven directly from the transistor 244 operating as an emitter follower.

The tunnel diode 252 operates in a circuit to detect amplitude variations or drop-outs in the frequency modulated video signal applied to the drop-out detector of FIGURE 3. The tunnel diode 252 is a semi-conductor device having a unique voltage-current characteristic. Specifically, as the voltage across the tunnel diode 252 increases from a ground potential in a positive direction, the current flow through the tunnel diode 252 increases until it reaches a maximum point. Further increases of the voltage across the tunnel diode 252 in the positive direction cause the current to rapidly dip or decrease until it reaches a minimum point. Further increases in the voltage across the tunnel diode 252 produce an increase in the current flow.

The detector circuit of FIGURE 3 biases the tunnel diode 252 so that it operates between the maximum and minimum current points. When the amplitude of the frequency modulated video signal is at a normal level, the voltage applied to the tunnel diode 252 is relatively high and the current flow is at the minimum point. With the votage high and the current low, the tunnel diode 252 appears as a very high resistance and the frequency modulated video signal is passed to the base of the transistor 254 through a circuit including a resistor 256 and a coupling capacitor 258. When the amplitude of the frequency modulated video signal falls below the acceptable level, which indicates a drop-out, the votage across the tunnel diode 252 decreases and the current rapidly increases to the maximum point. With the voltage low and the current high, the tunnel diode 252 appears as a very low resistance and the frequency modulated video signal is shorted through the tunnel diode 252 to the reference potential such as ground. The tunnel diode 252, therefore, operates video signal when the amplitude falls below a particular as a switch to rapidly cut off the frequency modulated value. For example, in FIGURE 2*a*, if the point 104 is determined to be the minimum acceptable value for the frequency modulated video signal, the tunnel diode 252 cuts off the signal at some time shortly after the amplitude of the frequency modulated video signal 100 falls below the value 104. The time in which the signal 100 is cut-off by the tunnel diode 202 is very small. It occurs before the point 108 shown in FIGURE 2*a*. Later portions of the circuit of FIGURE 3 provide the additional delay so that the control signal for the switch 16 of FIGURE 1 is not generated until the amplitude of the frequency modulated video signal stays below the point 104 for a period equivalent to the time period represented by the distance between the points 104 and 108.

A pair of resistors 260 and 262 provide the proper biasing for the base of the transistor 254. The collector of the transistor 254 is connected directly to the positive supply potential. The emitter of the transistor 254 is connected to the reference potential such as ground through a resistor 263. The transistor 254 is connected in the circuit to operate as an emitter follower, and the output from the transistor 254 is taken across the resistor 263 and applied through a coupling capacitor 264 to the base of a transistor 266. A pair of resistors 268 and 270 provide the proper biasing for the base of the transistor 266 and the emitter of the transistor 266 is coupled directly to the reference potential such as ground.

The collector of the transistor 266 is applied directly to the base of the transistor 272. A capacitor 274 is electrically disposed between the collector of the transistor 266 and the reference potential such as ground. The collector of the transistor 266 is also connected to a junction point between a resistor 276 and a Zener diode 278. The collector of the transistor 272 is connected directly to the positive supply potential and the emitter of the transistor 272 is connected to the reference potential such as ground through a resistor 280. A capacitor 282 is disposed between the emitter of the transistor 272 and a junction between a diode 284, a capacitor 286 and one terminal of a potentiometer 288. The other terminal of the potentiometer 288 and the movable arm of the potentiometer 288 are connected together and also to the resistor 276. A transistor 290 has its base connected to the junction of the Zener diode 278 and a resistor 292. The collector of the transistor 290 is coupled to the positive supply potential through a parallel circuit of a resistor 294 and a capacitor 296. The emitter of the transistor 290 is coupled to the reference potential such as ground through a resistor 298.

When a normal frequency modulated video signal is present and there are no drop-outs, the detector passes the signal through the emitter follower circuit including the transistor 254 to the base of the transistor 266. The amplitude of the frequency modulated video signal is sufficiently high to cause the transistor 266 to be turned on during each positive cycle of the frequency modulated signal so as to discharge the capacitor 274. When the capacitor 274 is discharged, this lowers the voltage on the base of the transistor 272. The emitter of the transistor 272 follows the voltage on the base of the transistor 272. When the voltage on the emitter of the transistor 272 is lowered, the voltage across the capacitor 282 is also lowered and this in turn lowers the voltage on the cathode of the diode 284. When the voltage on the cathode of the diode 284 is lower than the voltage on the anode of the diode 284, current flows through the diode 284 and a charging circuit is set up which includes the diode 284, the capacitor 282 and the resistor 280 so as to charge the capacitor 282. Therefore, every time the capacitor 274 is discharged, the capacitor 282 is charged. When the capacitor 274 is discharged through the transistor 266, the collector of the transistor 266 is essentially at ground potential and the transistor 290 is controlled to be in a non-conductive state.

When a drop-out occurs, the tunnel diode 252 produces a sharp cut-off of the frequency modulated video signals as explained above. The voltage on the base of the transistor 266, therefore, goes down and the transistor 266 is cut-off. The voltage at the collector of the transistor 266, therefore, starts to rise, and the capacitor 274 starts to charge through a circuit including the transistor 272, the capacitor 282, the potentiometer 288 and the resistor 276.

The charging current through the transistor 272 and the capacitor 282 is now in a direction opposite to the charging current which had previously charged the capacitor 282. This is possible because the diode 284 becomes reverse biased. The bucking action of the charge in the capacitor 282 provides for a delay in the charging of the capacitor 274. This delay provides the additional time needed, as explained above with reference to FIGURE 2*a*, so that the provision of the control signal does not occur until after a predetermined time. If, for example, the frequency modulated video signal were to rise above the point 104 shown in FIGURE 2*a* before the predetermined time elapses, the transistor 266 would be turned on and the capacitor 274 would be discharged to discontinue the operation of the circuit. The setting of the movable arm of the potentiometer 288 provides an adjustment of the charging rate of the capacitor 274.

When the voltage across the capacitor 274 builds up to a sufficient point, the Zener diode 278 breaks down and switches the transistor 290 to the conductive state. The transistor 266, in circuit with the other elements, provides a rising voltage and the circuit, therefore, appears as a ramp generator. The values of the various components of the ramp generator are selected to control the ramp voltage. Specifically, the charge in the capacitor 282 and the charging rate of the capacitor 274 are selected so that the voltage at the collector of the transistor 266 rises in a linear fashion. When the voltage rises in a linear fashion, it is possible to very accurately control the point in which the Zener diode 278 breaks down to switch the transistor 290 to the conductive state.

The output signal from the transistor 290 which is operated as an emitter follower is taken across the resistor 298 and applied to the base of a transistor 300. The emitter of the transistor 300 is connected directly to a reference potential such as ground. The collector of the transistor 300 is connected to the positive potential through a series-parallel circuit, including a resistor 302 in parallel across a series combination of the capacitor 304 and a resistor 306.

The control output from the transistor 300 is coupled through a series circuit of a resistor 308 and a coupling capacitor 310. When the transistor 290 is turned on, the transistor 300 follows to also become conductive. An output signal is, therefore, provided at the collector of the transistor 300. At the same time, the capacitor 304 is charged through the circuit of the capacitor 304, the resistor 306 and the transistor 300. When the signal to the base of the transistor 300 is extinguished which occurs when the drop-out is ended, the transistor 300 becomes cut-off. However, the charge on the capacitor 304 discharges after the transistor 300 is cut-off so as to provide a control signal for an additional period of time after the drop-out is no longer present in the signal. This additional period of time is to provide for the continuation of the control signal until the limiter 20 of FIGURE 1 stabilizes as explained previously. The discharge of the capacitor 304 produces the extra period of the compensation as shown by the extra length of compensating period 110 in FIGURE 2*b*.

The control signal from the drop-out detector circuit of FIGURE 3 is applied to the switch 16 as shown in FIGURE 1. As indicated above, the switching circuit may be of a type as shown in U.S. Patent No. 3,328,521 in the name of Irving Moskovitz and assigned to Minnesota Mining Manufacturing Company.

It can be seen that the drop-out detector circuit of FIGURE 3 provides a detection of a reduction in amplitude of the frequency modulated video signal and includes a delay in order to insure that the detected reduction in amplitude is actually a drop-out and is not due to noise or other amplitude variations. The detector circuit of FIGURE 3 provides the delay by charging a first capacitor through a previously oppositely charged second capacitor. This not only produces the delay as explained above, but, in addition, produces a linear output signal so that the drop-out compensation can be accurately controlled to occur at particular point. It is to be appreciated that although the additional delay is provided in the drop-out detector of FIGURE 3, the delay line 18 of FIGURE 1 compensates for this additional delay so that the drop-out compensation actually occurs over the complete period of the drop-out in the frequency modulated video signal. It is also to be appreciated that although the invention has been described with reference to a particular embodiment, it is obvious that other adaptations and modifications may be made. The invention, therefore, is only to be limited by the appended claims.

What is claimed is:

1. In a system for compensating for drop-outs in a frequency modulated video signal, including
   first means for receiving the frequency modulated video signal,
   second means operatively coupled to the first means for producing a control signal when the frequency modulated video signal falls below a particular amplitude and with the second means including means for inhibiting the production of the control signal and delaying such production of the control signal and delaying such production until the frequency modulated video signal remains below the particular amplitude for a first particular period of time.
   third means operatively coupled to the first means for demodulating the frequency modulated video signal on a delayed basis and with the delay corresponding to the delay provided by the means included in the second means,
   fourth means operatively coupled to the third means for delaying the video signal from the third means for a second particular period of time, and
   fifth means operatively coupled to the second, third and fourth means for passing the video signals from the third means in the absence of the control signal from the second means and for passing the delayed video signals from the fourth means in the presence of the control signal from the second means.

2. The compensating system of claim 1 wherein the delay provided by the means included in the second means is at least 0.8 μsec.

3. In a system for compensating for drop-outs in a frequency modulated video signal, including
   first means for receiving the frequency modulated video signal,
   second means operatively coupled to the first means for producing a control signal when the frequency modulated video signal falls below a particular amplitude and with the second means including means for inhibiting the production of the control signal and delaying such production until the frequency modulated video signal remains below the particular amplitude for a first particular period of time.
   third means operatively coupled to the first means for delaying the frequency modulated video signal a period of time corresponding to the delay provided by by the means included in the second means,
   fourth means operatively coupled to the third means for demodulating the frequency modulated video signal to reproduce the video signal,
   fifth means operatively coupled to the fourth means for delaying the video signal from the fourth means for a second particular period of time, and
   sixth means operatively coupled to the second, fourth and fifth means for passing the video signals from the fourth means in the absence of the control signal from the second means and for passing the video signals from the fifth means in the presence of the control signal from the second means.

4. In a system for compensating for drop-outs in a frequency modulated video signal, including
   first means for receiving the frequency modulated video signal,
   second means operatively coupled to the first means for detecting the reduction of the frequency modulated signal below a particular amplitude and with the detection occurring after a predetermined relay,
   third means operatively coupled to the second means to produce a control signal when the frequency modulated video signal is below the particular amplitude and with the third means including means for inhibiting the production of the control signal and delaying such production until the frequency modulated video signal is below the particular amplitude for a first particular period of time,
   fourth means operatively coupled to the first means for demodulating the frequency modulated video signal on a delayed basis corresponding to the delay provided by the second means and the means included in the third means to reproduce the video signal,
   fifth means operatively coupled to the fourth means for delaying the video signals from the fourth means for a second particular period of time, and
   sixth means operatively coupled to the third, fourth and fifth means for passing the delayed signal from the fifth means in the presence of a control signal from the third means and for passing the signals from the fourth means in the absence of a control signal from the third means.

5. The compensating system of claim 4 wherein the delay provided by the second means and the means included in the third means is at least 0.8 μsec.

6. In a system for compensating for drop-outs in a frequency modulated video signal, including
   first means for receiving the frequency modulated video signal,
   second means operatively coupled to the first means for detecting the reduction of the frequency modulated signal below a particular amplitude and with the detection occurring after a predetermined relay,
   third means operatively coupled to the second means to produce a control signal when the frequency modulated video signal is below the particular amplitude and with the third means including means for inhibiting the production of the control signal and delaying such production until the frequency modulated video signal is below the particular amplitude for a first particular period of time,
   fourth means operatively coupled to the first means for delaying the frequency modulated video signal a period of time corresponding to the delay provided by the second means and the means included in the third means,
   fifth means operatively coupled to the fourth means for demodulating the frequency modulated video signal to reproduce the video signal,
   sixth means operatively coupled to the fifth means for delaying the video signals from the fifth means for a second particular period of time, and
   seventh means operatively coupled to the third, fifth and sixth means for passing the signals from the sixth means in the presence of a control signal from the third means and for passing the signals from the fifth means in the absence of a control signal from the third means.

7. In a system for compensating for drop-outs in a frequency modulated video signal, including
   first means for detecting the frequency modulated video signal,
   second means operatively coupled to the first means for producing a first signal when the frequency modulated video signal falls belows a particular amplitude and with the first signal produced after a predetermined delay,
   third means operatively coupled to the second means for producing a control signal and including means for delaying the production of the control signal and inhibiting such production until the frequency modulated video signal remains below the particular amplitude for a particular length of time, fourth means operatively coupled to the first means for demodulating the frequency modulated video signal on a delayed basis and with the delay period corresponding to the particular length of time, fifth means operatively coupled to the fourth means for delaying the video signal, and sixth means operatively coupled to the third, fourth and fifth means for passing the video signal from the fourth means in the absence of the control signal from the third means and for passing the delayed video signal from the fifth means in the presence of the control signal from the third means.

8. The compensating system of claim 7 wherein the delay provided by the second means and the means included in the third means is at least 0.8 $\mu$sec.

9. In a system for compensating for the drop-outs in a frequency modulated video signal, including first means for detecting the frequency modulated video signal, second means operatively coupled to the first means for producing a first signal when the frequency modulated video signal falls belows a particular amplitude and with the first signal produced after a predetermined delay, third means operatively coupled to the second means for producing a control signal and including means for delaying the production of the delay signal and inhibiting such production until the frequency modulated video signal remains below the particular amplitude for a particular length of time, fourth means operatively coupled to the first means for delaying the frequency modulated video signal a period of time corresponding to the delay provided by the second and third means, fifth means operatively coupled to the fourth means for demodulating the frequency modulated video signal to produce the video signal.

sixth means operatively coupled to the fifth means for delaying the video signal, and seventh means operatively coupled to the third, fifth and sixth means for passing the video signal from the fifth means in the absence of the control signal from the third means and for passing the video signal from the sixth means in the presence of the control signal from the third means.

10. In combination for compensating for drop-outs which occur in a storage medium on which viodeo information is recorded as a frequency modulated carrier signal, first means for reproducing the video information from the storage medium, second means operatively coupled to the reproducing means for providing for a detection of the video information to produce a switching signal representing a drop-out upon a failure to reproduce a signal of a particular amplitude from the tape and with the second means including means for delaying the production of the switching signal and inhibiting such production until the signal from the tape is below the particular amplitude for a particular number of cycles of the carrier signal, third means operatively coupled to the first means for detecting the frequency modulated carrier on a delayed basis corresponding to the delay provided by the means included in the second means to reproduce the video information, fourth means operatively coupled to the third means for delaying the signals from the third means for a particular period of time, and fifth means operatively coupled to the second, third and fourth means for passing the signals from the third means before the production of the switching signal and for passing the signals from the fourth means upon the production of the switching signals.

11. The combination of claim 10 wherein the means included in the second means delays and inhibits the production of the switching signal for a number of cycles of the carrier signal equal to a period of time of at least 0.8 $\mu$sec.

12. In combination for compensating for drop-outs which occur in a storage medium on which video information is recorded as a frequency modulated carrier signal, first means for reproducing the video information from the storage medium, second means operatively coupled to the reproducing means for providing for a detection of the video information to produce a switching signal representing a drop-out upon a failure to reproduce a signal of a particular amplitude from the tape and with the second means including means for delaying the production of the switching signal and inhibiting such production until the signal from the tape is below the particular amplitude for a particular number of cycles of the carrier signal, third means operatively coupled to the first means for detecting the frequency modulated carrier on a delayed basis corresponding to the delay provided by the means included in the second means to reproduce the video information, fourth means operatively coupled to the third means for delaying the signals from the third means for a particular period of time, and fifth means operatively coupled to the second, third and fourth means for passing the signals from the third means before the production of the switching signal and for passing the signals from the fourth means upon the production of the switching signals.

13. In a system for compensating for drop-outs in a frequency modulated video signal wherein the drop-outs are detected in the frequency modulated video signal and the compensation is provided in the demodulated video signal by switching to a previous portion of the video signal during the period of the drop-out, a drop-out detector including first means for receiving the frequency modulated video signal, second means operatively coupled to the first means for producing a first signal when the amplitude of the frequency modulated video signal falls below a particular value and with the first signal produced after the predetermined delay, and third means operatively coupled to the second means for providing a second signal and including means for delaying the production of the second signal and inhibiting such production until the amplitude of the frequency modulated video signal remains below the particular value a particular length of time.

14. The drop-out detector of claim 13 wherein the delay provided by the second means and the means included in the third means is at least 0.8 $\mu$sec.

15. The drop-out detector of claim 14 wherein the means included in the third means for delaying and inhibiting the production of the second signal includes charging a first capacitor in a first direction through a circuit including a second capacitor which has been previously charged in the opposite direction.

16. In a system for compensating for drop-outs in a frequency modulated video signal wherein the drop-outs are detected in the frequency modulated video signal and the compensation is provided in the demodulated video signal by switching to a previous portion of the video signal during the period of the drop-out, a drop-out detector including first means for receiving the frequency modulated video signal, second means operatively coupled to the first means for producing a first signal when the amplitude of the frequency modulated video signal falls below a particular value and with the first signal produced after a predetermined delay, third means operatively coupled to the second means for generating a varying amplitude ramp signal during the period of time the second means provides the first signal, and fourth means operatively coupled to the third means for producing a control signal when the ramp signal reaches a particular amplitude and with the third and fourth means constituting a delay means to delay the production of the control signal and to inhibit such production until the frequency modulated video signal is below the particular value for a particular period of time.

17. The drop-out detector of claim 16 wherein the delay provided by the second means and third means before the ramp signal reaches the particular amplitude is at least 0.8 $\mu$sec.

18. The drop-out detector of claim 16 wherein the third means includes a first and a second capacitor and wherein the first capacitor is charged in a first direction through a circuit including the second capacitor which has been previously charged in the opposite direction.

19. The drop-out detector of claim 18 wherein the charging of the first capacitor in the first direction through the circuit including the second capacitor previously charged in the opposite direction produces a ramp signal having a linear change in amplitude for successive periods of time.

References Cited

UNITED STATES PATENTS

| | | | |
|---|---|---|---|
| 2,996,576 | 8/1961 | Dolby. | |
| 3,056,858 | 9/1962 | Milne. | |
| 3,141,926 | 7/1964 | Newell. | |
| 3,344,354 | 8/1967 | Bellem | 325—348 |

ROBERT L. GRIFFIN, Primary Examiner

D. E. STOUT, Assistant Examiner

U.S. Cl. X.R.

329—101, 132, 205